United States Patent

Hartsock (10) Patent No.: US 10,412,943 B2
(45) Date of Patent: Sep. 17, 2019

(54) RATTLE REEL

(71) Applicant: William Hartsock, Burtrum, MN (US)

(72) Inventor: William Hartsock, Burtrum, MN (US)

( * ) Notice: Subject to any disclaimer, the term of this patent is extended or adjusted under 35 U.S.C. 154(b) by 172 days.

(21) Appl. No.: 14/988,204

(22) Filed: Jan. 5, 2016

(65) Prior Publication Data

US 2016/0205912 A1 Jul. 21, 2016

Related U.S. Application Data

(60) Provisional application No. 62/099,709, filed on Jan. 5, 2015.

(51) Int. Cl.
*A01K 89/015* (2006.01)
*A01K 89/08* (2006.01)
*A01K 97/12* (2006.01)

(52) U.S. Cl.
CPC ........ *A01K 89/0178* (2015.05); *A01K 89/081* (2015.05); *A01K 97/12* (2013.01); *A01K 97/125* (2013.01)

(58) Field of Classification Search
CPC .. A01K 89/0178; A01K 89/081; A01K 97/01; A01K 97/12; A01K 97/125
USPC ................................................ 43/4, 17, 17.5
See application file for complete search history.

(56) References Cited

U.S. PATENT DOCUMENTS

| | | | | | |
|---|---|---|---|---|---|
| 2,732,543 | A * | 1/1956 | Mogren | ................. | A01K 97/01 200/61.52 |
| 3,168,789 | A * | 2/1965 | Gednalske | ............ | A01K 97/01 43/19.2 |
| 3,645,029 | A * | 2/1972 | Roemer | ................. | A01K 97/01 43/17 |
| 4,616,437 | A * | 10/1986 | Harvey | .................. | A01K 97/01 43/17 |
| 4,718,190 | A * | 1/1988 | Ward | ..................... | A01K 97/01 43/17 |
| 5,107,614 | A * | 4/1992 | Gonnello | ............... | A01K 97/01 43/17 |
| 6,374,532 | B1 * | 4/2002 | Klein | ..................... | A01K 97/01 43/17 |
| 6,408,561 | B1 * | 6/2002 | Winter | ................. | A01K 97/125 43/17.5 |
| 6,651,373 | B2 * | 11/2003 | Harris | .................... | A01K 97/01 43/19.2 |
| 7,032,343 | B1 * | 4/2006 | Foss | ........................ | A01K 97/01 43/17 |
| 8,176,672 | B1 * | 5/2012 | Schmeisser | ............ | A01K 97/01 43/16 |

(Continued)

*Primary Examiner* — Darren W Ark
*Assistant Examiner* — Brady W Frazier
(74) *Attorney, Agent, or Firm* — Merchant & Gould P.C.

(57) ABSTRACT

Certain types of rattle reels include a housing; a reel coupled to the housing; and an indicator arrangement carried by the housing. The indicator arrangement is operationally coupled to the reel so that movement of the reel relative to the housing activates the indicator arrangement. The indicator arrangement remains activated until the user manually resets the indicator arrangement. Certain types of rattle reels include a free-standing housing including an adjustable leg; a reel coupled to the housing; a power source carried by the housing; a light source carried by the housing; and a user interface member accessible for activating and deactivating the light source.

19 Claims, 6 Drawing Sheets

(56) References Cited

U.S. PATENT DOCUMENTS

| | | | | |
|---|---|---|---|---|
| 8,756,854 | B1* | 6/2014 | Michaels | A01K 97/01 43/17 |
| 2004/0003532 | A1* | 1/2004 | Shaff | A01K 97/01 43/17 |
| 2006/0130387 | A1* | 6/2006 | Shumansky | A01K 97/01 43/17 |
| 2007/0227057 | A1* | 10/2007 | Holmberg | A01K 97/01 43/17 |
| 2008/0035775 | A1* | 2/2008 | Hoag | A01K 89/015 242/305 |
| 2008/0282597 | A1* | 11/2008 | Gascoingne | A01K 89/08 43/17 |
| 2012/0210626 | A1* | 8/2012 | Manlick | A01K 97/01 43/4.5 |
| 2015/0208633 | A1* | 7/2015 | Schramski | A01K 97/01 43/4.5 |
| 2015/0208635 | A1* | 7/2015 | Hondl | A01K 89/015 43/17 |
| 2016/0106086 | A1* | 4/2016 | Braaten | A01K 97/125 43/17 |

* cited by examiner

RATTLE REEL

CROSS REFERENCE TO RELATED APPLICATION

This application claims the benefit of U.S. Provisional Application No. 62/099,709, filed Jan. 5, 2015, and titled "Two three four legged collapsible free standing led light up electronic ice fishing rattle reel," the disclosure of which is hereby incorporated herein by reference.

BACKGROUND

Conventional rattle reels used in ice fishing include a fishing reel containing a loose bell. One end of a fishing line wound around the reel can be lowered into the water. When a fish tugs on the line, the line unwinds from the reel, which causes the reel to rotate. Rotation of the reel causes the bell to jingle within the reel, thereby alerting the user that a fish has taken the bait. However, if the fish stops moving or gets away, then the reel will stop rotating and the bell will cease jingling. Accordingly, the user may not know that a fish is on the line or that the bait is missing.

Improvements are desired.

SUMMARY

Aspects of the disclosure are directed to a rattle reel for fishing. The rattle reel includes a housing; a reel coupled to the housing; and an indicator arrangement carried by the housing. The reel has a drum sized and structured to hold a fishing line wound around the drum. The indicator arrangement is operationally coupled to the reel so that movement of the reel relative to the housing activates the indicator arrangement. The indicator arrangement remains activated until the user manually resets the indicator arrangement.

In certain implementations, the indicator arrangement includes an audible indicator. In an example, the audible indicator includes a buzzer.

In certain implementations, the indicator arrangement includes a visual indicator. In an example, the visual indicator includes a light emitting diode arrangement.

In certain implementations, the indicator arrangement includes an audible indicator and a visual indicator.

In certain implementations, a first user interface member is carried by the housing. The first user interface member is operationally coupled to the indicator arrangement so that actuation of the first user interface member resets the indicator arrangement. In an example, the first user interface member includes a switch accessible from an exterior of the housing.

In certain examples, a light source that is activated independent of movement of the reel relative to the housing. In an example, the light source is activated by actuation of a second user interface member carried by the housing. In examples, the second user interface member includes a switch.

In certain implementations, a light source is activated by actuation of a user interface member accessible from an exterior of the housing.

In certain implementations, the indicator arrangement includes an electronic indicator that is electrically coupled to a power source carried by the housing.

In certain implementations, the reel includes an externally accessible manual take-up member by which the user manually winds the fishing line onto the drum. In an example, the manual take-up member defines a depression sized for a finger of the user. In another example, the manual take-up member includes a handle.

In certain implementations, the housing is supported by at least one telescoping leg. In examples, the housing is supported by a plurality of telescoping legs. In an example, an angle of each leg relative to the housing is adjustable.

In accordance with other aspects of the disclosure, a rattle reel for fishing. The rattle reel includes a free-standing housing including an adjustable leg; a reel coupled to the housing; a power source carried by the housing; a light source carried by the housing and electrically coupled to the power source; and a user interface member accessible from an exterior of the housing and electrically coupled to the light source. The reel has a drum sized and structured to hold a fishing line wound around the drum. The light source is configured to shine light downwardly away from the reel. The user interface member activates and deactivates the light source when operated by a user.

In certain implementations, an indicator arrangement is electrically coupled to the power source. The indicator arrangement is configured to activate when the reel moves relative to the housing. In certain examples, the indicator arrangement is activated by actuation of an electronic micro switch carried by the housing. The electronic micro switch is actuated by movement of the reel relative to the housing.

In an example, the electronic micro switch has a portion engaging the reel. The reel is shaped with at least one depression or protrusion. The indicator arrangement remains deactivated while the portion of the electronic micro switch engages the depression or protrusion. The indicator arrangement is activated when the portion of the electronic micro switch cams out of the depression during movement of the reel relative to the housing.

In an example, the indicator arrangement includes a buzzer. In an example, the indicator arrangement includes a light emitting diode arrangement. In an example, the indicator arrangement includes a buzzer and a light emitting diode arrangement.

In certain implementations, the free-standing housing includes a plurality of adjustable legs. In certain examples, the legs are telescoping legs.

In certain implementations, the reel includes a manual take-up member that defines a thumb depression.

DETAILED DESCRIPTION

The disclosure is directed to a rattle reel of the type used in fishing. In accordance with some aspects of the disclosure, the rattle reel is free-standing (i.e., does not need to be secured to a vertical surface or mounted to a pre-existing structure). In accordance with other aspects of the disclosure, the rattle reel includes a sticky indicator that continues to provide an indication of reel movement until manually deactivated by a user, even if the reel movement has ceased. In certain examples, the sticky indicator is a visual indicator, an auditory indicator, and/or any other alert. In accordance with other aspects of the disclosure, the rattle reel includes a work light that can be turned on and off by the user. In accordance with other aspects of the disclosure, the rattle reel includes a manual take-up member to facilitate winding of the line on the reel.

Figure 1:
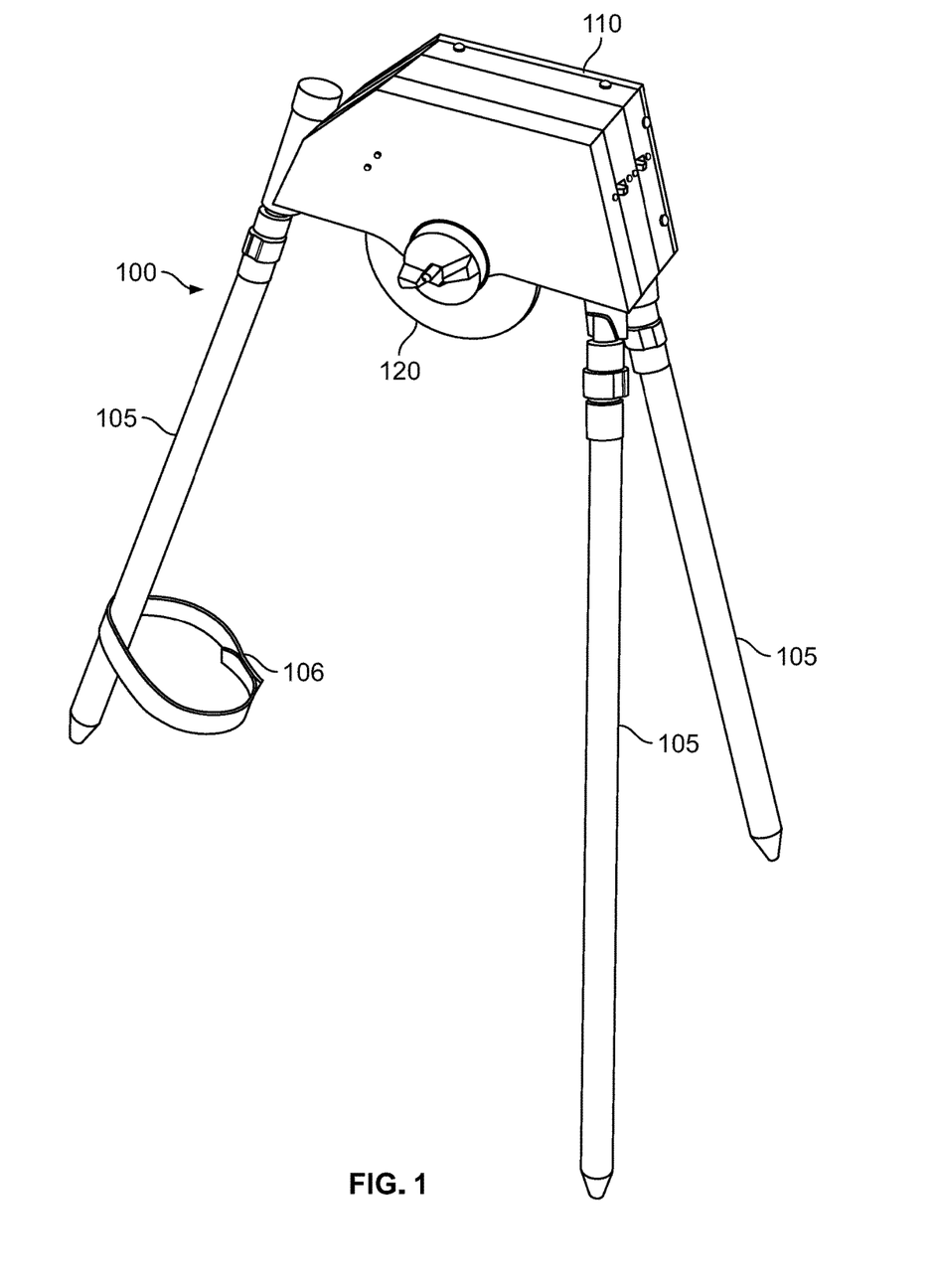
FIG. 1 is a rear perspective view of an example rattle reel including a housing, reel arrangement, and axle arrangement configured in accordance with the principles of the present disclosure.
Figure 2:
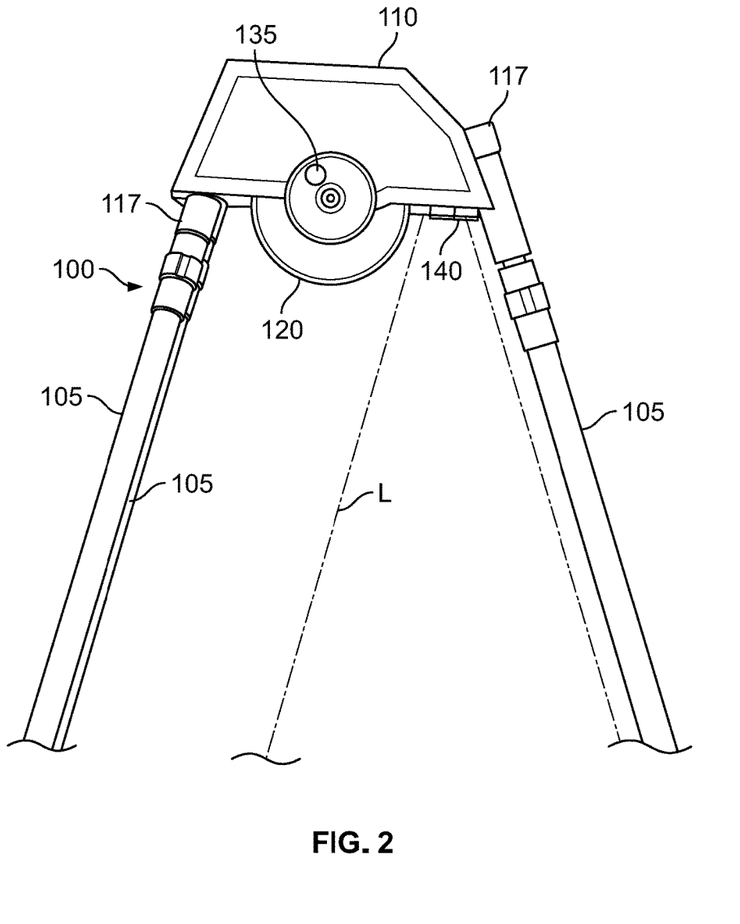
FIG. 2 is a partial front end view of the rattle reel of FIG. 1.

The figures generally illustrate an example rattle reel 100 configured in accordance with the principles of the present disclosure. As shown in FIGS. 1 and 2, the rattle reel 100 includes a housing 110 supported by one or more legs 105. Accordingly, the rattle reel 100 is free-standing. For example, the rattle reel 100 need not be mounted to a vertical surface (e.g., a wall) while in use. In certain examples, the housing 110 is supported by a plurality of legs 105. In the example shown, the housing 110 is supported by three legs. In other examples, the housing 110 can be supported by two legs, four legs, five legs, or any desired number of legs.

Figure 9:
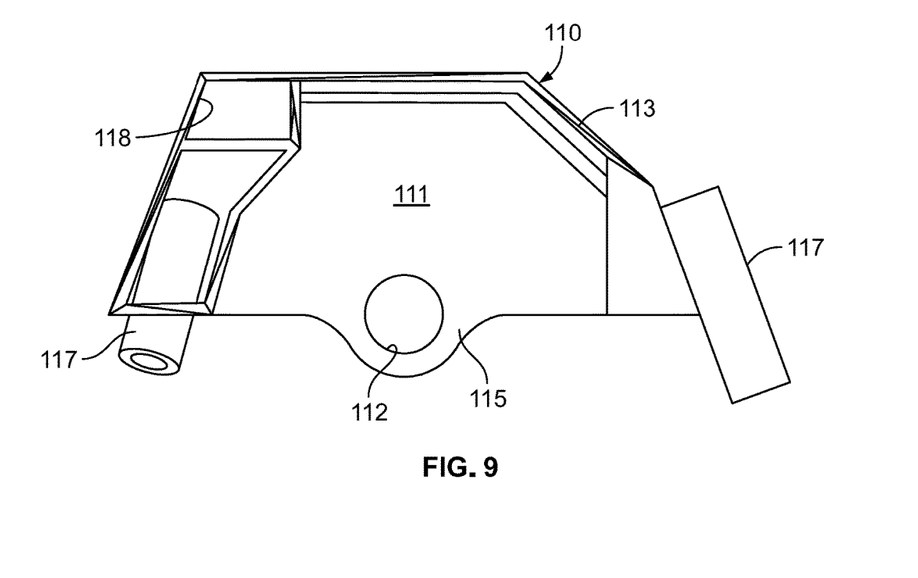
FIG. 9 is a front end view of an example housing of the rattle reel of FIG. 1.

In certain implementations, the housing 110 includes leg mounts 117 at which the legs 105 can be attached to the housing 110 (see FIG. 9). In certain examples, the leg mounts 117 define cavities into which proximal ends of the legs 105 can be inserted and secured (e.g., using adhesive, fasteners, friction, or other securement mechanisms). In certain implementations, the legs 105 are removable from the housing 110. For example, the legs can be attached to/detached from the housing 110 using a push-button mechanism.

In certain implementations, a length of the leg(s) 105 is adjustable. In certain examples, each leg 105 has a telescoping configuration that enables a user to adjust the length of the leg, thereby adjusting the height of the housing 110 from the surface (e.g., the ice) on which the legs seat. In certain implementations, the user also can adjust an angle of one or more of the legs 105 relative to the housing 110. For example, one or more legs 105 mounted to the housing 110 so as to allow pivotal, rotational, or other articulating movement relative to the housing 110. In certain examples, a resilient cord can be strung through the legs 105 to aid in collapsing or positioning the legs 105.

In certain implementations, distal ends of the legs 105 can be moved towards each other when the rattle reel 100 is not in use. In certain examples, the legs 105 can be secured together for storage and/or transport. For example, a tie member 106 can be provided to wrap around the legs 105. In an example, the tie member 106 can be permanently attached to one of the legs 105. In an example, the tie member 106 can include two loose ends that attach together using Velcro®, a buckle, or other fastening mechanism.

In still other implementations, the rattle reel 100 can be mounted to a surface (e.g., a wall) using a bracket. The bracket would be mounted to the surface (e.g., using fasteners). The housing 110 of the rattle reel 100 would fit with holding members of the bracket (e.g., friction fit, snap-fit, latch, etc.) or otherwise secure to the bracket. Optionally, the legs 105 are removable when the housing 110 is mounted to the bracket.

In some implementations, the housing 110 defines an interior 111 in which the reel 120 and other components are mounted. In certain implementations, the housing 110 includes a base 113 and a cover 114 that secures to the base 113 to at least partially enclose the interior 111. In certain examples, the housing 110 defines an open bottom leading to the interior 111. In certain implementations, the base 113 defines an opening 112 that aligns with a corresponding opening 112 of the cover 114.

Figure 3:
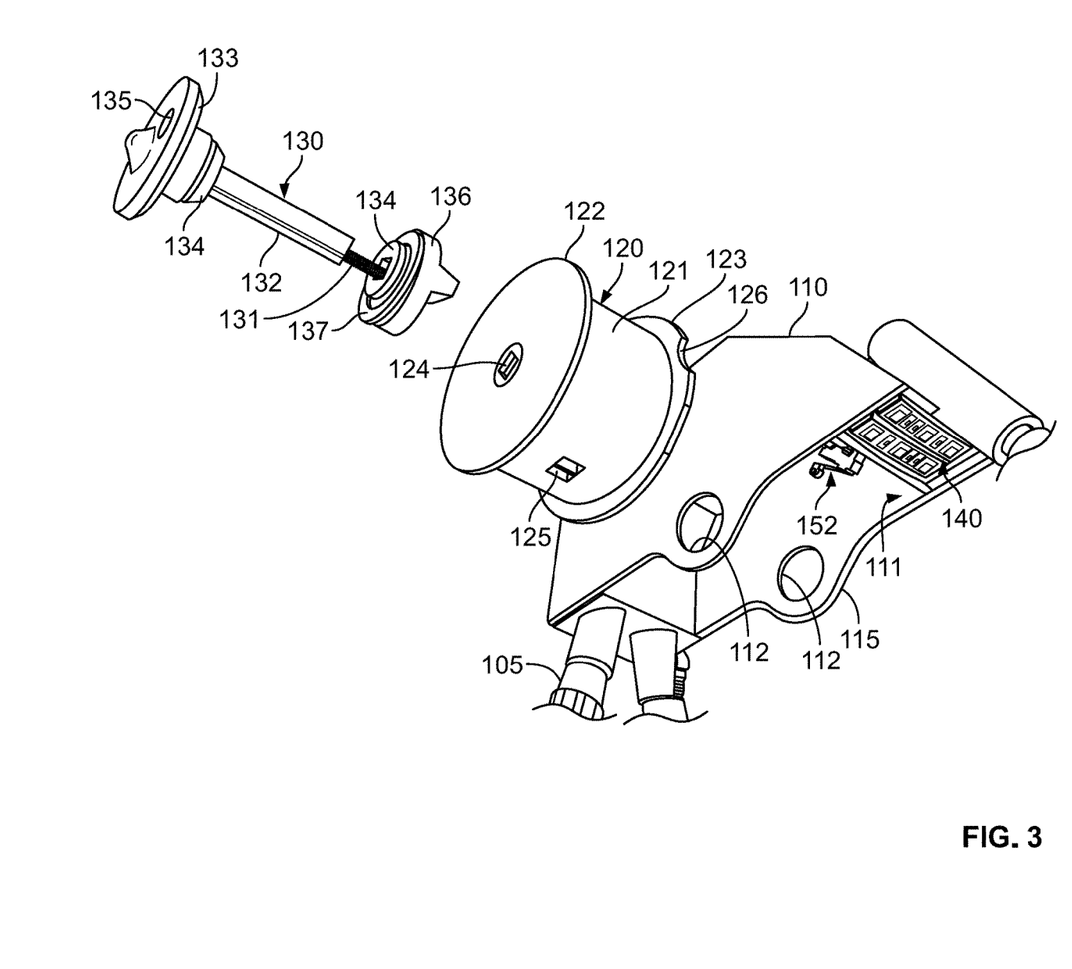
FIG. 3 is a bottom perspective view of the housing of the rattle reel of FIG. 1 with the reel arrangement and axle arrangement exploded outwardly from the housing.
Figure 4:
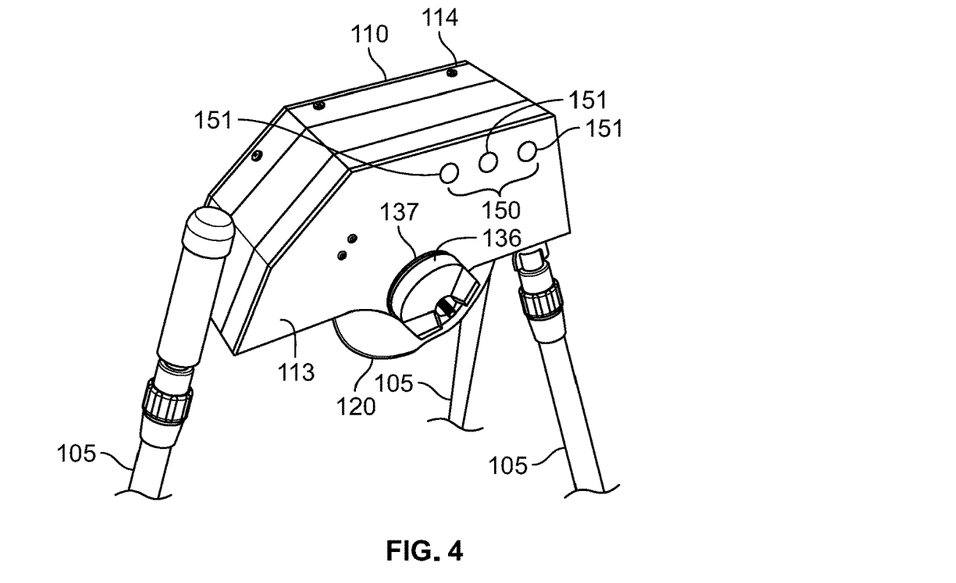
FIG. 4 is a partial rear perspective view of the housing, reel arrangement, and axle arrangement of FIG. 3 assembled together.
Figure 5:
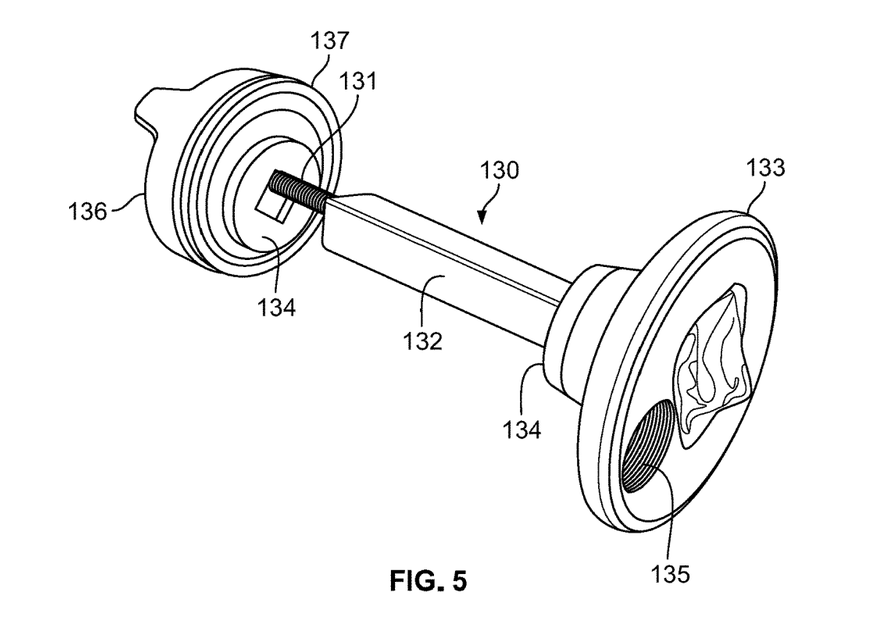
FIG. 5 is a perspective view of the axle arrangement of FIG. 3.
Figure 6:
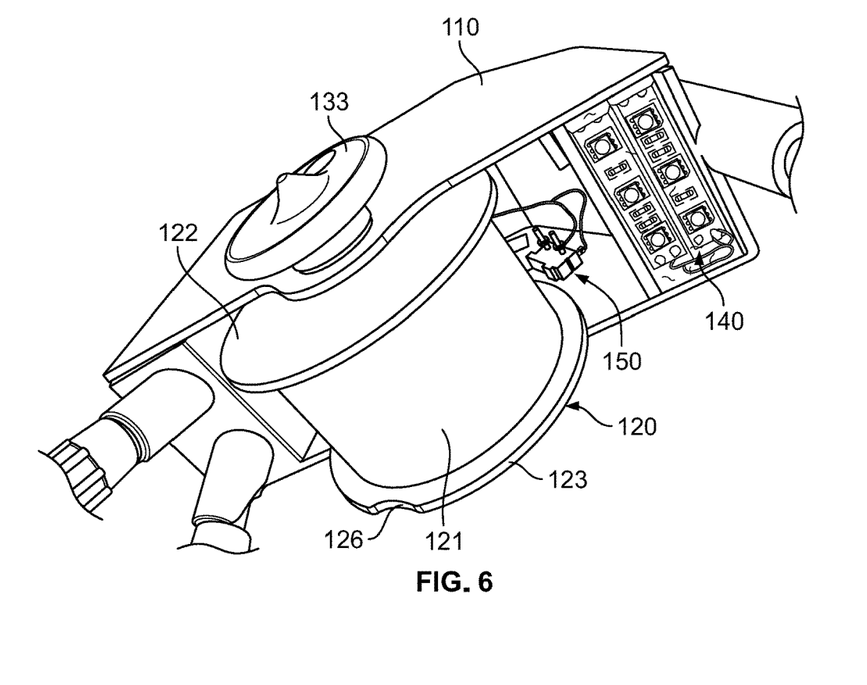
FIG. 6 is a bottom perspective view of the rattle reel of FIG. 1.

As shown in FIGS. 3-5, a reel arrangement 120 can be mounted to the housing 110 using an axle arrangement 130. The reel arrangement 120 includes a drum 121 around which a fishing line or other flexible member can be wound. In certain implementations, the drum 121 extends between a first flange 122 and a second flange 123. The reel arrangement 120 defines a through-passage 124 through which the axle arrangement 130 extends. The drum 121 includes a catch member 125 at which a first end of the fishing line or other flexible member is attached. In certain examples, the drum 121 is hollow. In an example, a bell (not shown) can be disposed within the drum 121 and free to move within the drum 121 upon rotation of the reel arrangement 120.

The reel arrangement 120 is carried by the axle arrangement 130, which is rotatably mounted to the housing 110. The reel arrangement 130 includes an axle 131 extending between a first end member 133 and a second end member 136. In certain examples, the first end member 133 does not rotate relative to the axle 131 while the second end member 136 can rotate relative to the axle 131. The axle 131 is sized to fit within the through-passage 124 of the reel arrangement 120 and through openings 112 defined in the housing 110. Each end member 133, 136 is larger than the through-passage 124 and is larger than the openings 112.

A fixing member 132 is mounted over at least part of the axle 131. The fixing member 132 is sized to fit within the through-passage 124. The fixing member 132 is shaped to inhibit rotational movement of the reel arrangement 120 relative to the fixing member 132. For example, the shape of the fixing member 132 can be keyed to a shape of the through-passage 124. In the example shown in FIG. 3, the fixing member 132 and the through-passage 124 have rectangular cross-sectional areas. In other examples, however, the fixing member 132 can otherwise be shaped to key with the through-passage 124. The first end member 133 rotates in unison with the fixing member 132. Accordingly, the first end member 133 rotates in unison with the fixing member 132 during winding and unwinding of the reel 120. Rotational movement of the fixing member 132 causes rotation of the reel arrangement 120.

In certain examples, the reel arrangement 130 also includes one or more spacers 134 (e.g., a bushing, a washer, a grommet, a gasket, etc.) adjacent the end members 133, 136. Each spacer 134 is disposed between the respective end member 133, 136 and the reel arrangement 120. Each spacer 134 is larger than the passage 124 through the reel arrangement 120. In certain implementations, each spacer 134 is disposed within the housing 110 and/or the opening 112. Each spacer 134 is rotationally keyed to the fixing member 132.

In certain implementations, the first end member 133 includes a manual take-up member 135 that facilitates winding of the fishing line or other flexible member onto the drum 121. The user winds the fishing line onto the drum by rotating the first end member 133 relative to the housing 110 using the manual take-up member 135. In the example shown, the manual take-up member 135 includes a depression (e.g., sized for a finger) defined in the first end member 133. A user places a finger in the depression and moves the finger in circles to rotate the first end member 133. In other examples, the manual take-up member 135 could be a handle or other grip structure.

The second end member 136 and a friction plate 137 mount over the axle 131 and are configured to move axially over the axle 131. In certain implementations, the second end member 136 and the friction plate 137 do not key to the fixing member 132. The second end member 136 cooperates with the friction plate 137 to apply pressure to the housing 110 to increase or decrease the torque needed to rotate the reel arrangement 120 relative to the housing 110. For example, when actuated, the second end member 136 pulls the axle 131 (and hence the first end member 133 and reel arrangement 120) axially towards the second end member 136. Accordingly, the housing portion 115 around the opening 112 adjacent the second end member 136 is clamped or squeezed between the friction plate 137 and the reel arrangement 120 (e.g., the second flange 123).

In certain implementations, the second end member 136 can be threadably mounted to the axle 131 so that rotation of the second end member 136 moves the second end member 136 along the axle 131. To increase the torque necessary to turn the reel 120, the second end member 136 is actuated (e.g., rotated in a first direction) to pull the reel arrangement 120 towards the second end member 136 and clamp the housing portion 115 between the friction plate 137 and the reel arrangement 120. To decrease the necessary torque, the second end member 136 in rotated in the opposite direction to expand the axial distance between the first and second members 133, 136.

Figure 7:
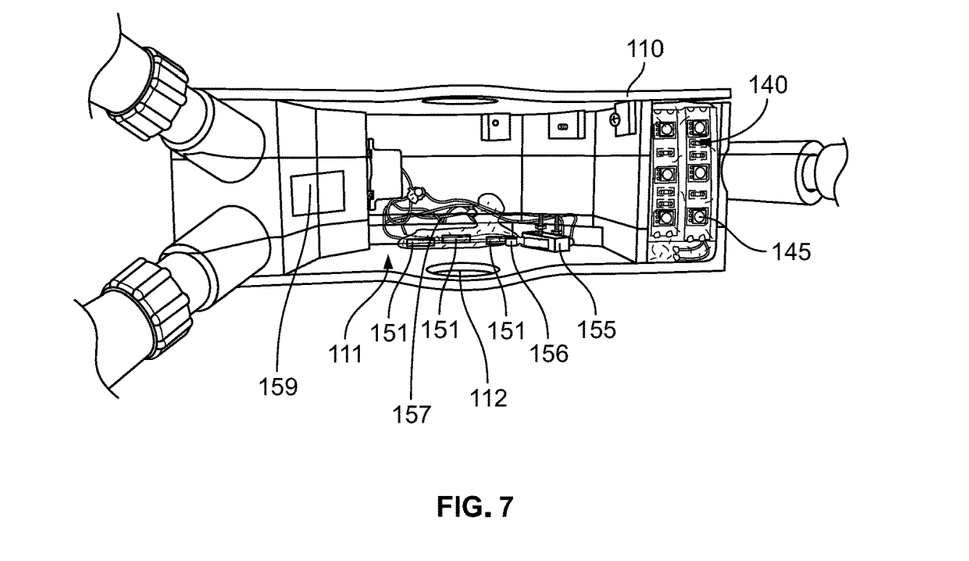
FIG. 7 is a bottom plan view of the rattle reel of FIG. 1 with the reel arrangement and axle arrangement removed from the housing for ease in viewing interior components of the housing.

In accordance with certain aspects of the disclosure, the rattle reel 100 includes an indicator that activates when the reel arrangement 120 rotates relative to the housing 110. In certain implementations, the indicator includes an electronic indicator that is electrically coupled (see connections 157) to a power source 159 carried by the housing 110 (see FIG. 7). In certain examples, the power source 159 is disposed within a cavity 118 (FIG. 9) defined by the base 113 and cover 114. In an example, the base 113 and cover 114 cooperate to fully enclose the cavity 118.

Figure 8:
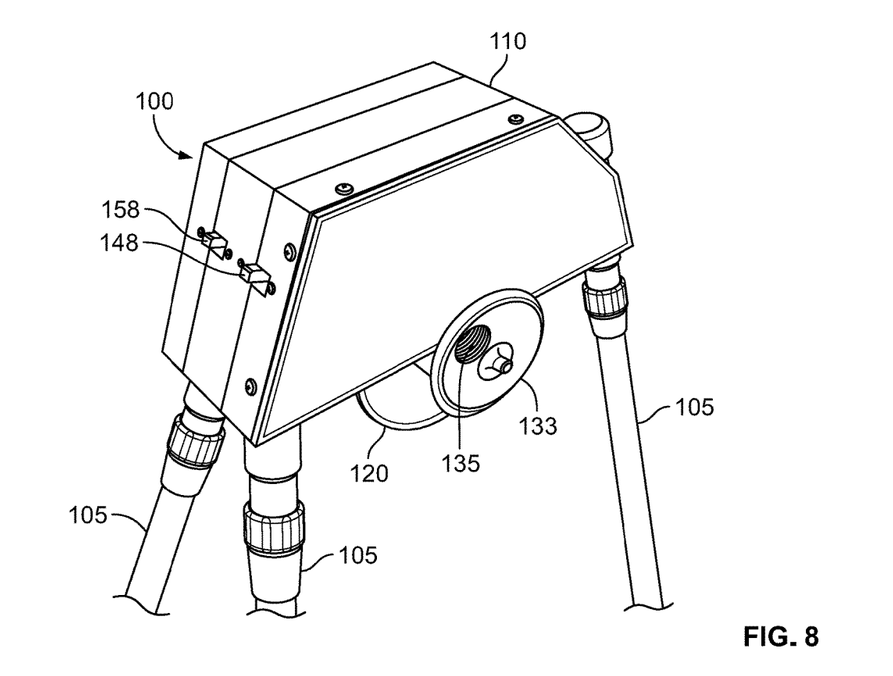
FIG. 8 is a partial front perspective view of the rattle reel of FIG. 1.

The electronic indicator also is electrically coupled to a user interface member 158 accessible from outside the housing 110 (e.g., se FIG. 8). For example, the electronic indicator may be electrically coupled to a switch, button, or other user interface member 158 to deactivate the indicator when triggered. In certain examples, the user interface member 158 also can activate the indicator independent of movement of the reel 120 relative to the housing 110.

In some implementations, the indicator includes an auditory indicator. For example, rotation of the reel arrangement 120 may activate a buzzer, siren, or other audible alarm. In other implementations, the indicator includes a visual indicator 150. For example, one or more light emitting diodes (LEDs) carried by the housing 110 can be activated to emit light, flash, or otherwise provide a visual indication upon rotation of the reel 120. In still other examples, rotation of the reel 120 can activate both an auditory alarm and a visual alarm.

In certain example, the visual indicator 150 includes one or more LEDs 151 visible from outside the housing 110. In the example shown in FIG. 4, the visual indicator 150 includes three LEDs (see also FIG. 7). In other examples, however, the visual indicator 150 can include a greater or lesser number of LEDs 151 or other light sources. In some examples, the LEDs 151 are the same color. In other examples, the LEDs 151 can be different colors. In the example shown in FIG. 4, the LEDs 151 form a line. In other examples, the LEDs 151 can be arranged in other patterns or configurations. In some implementations, the visual indicator 150 emits light to indicate movement of the reel 120. In other implementations, the visual indicator 150 flashes to indicate movement of the reel 120.

In some implementations, the rattle reel 100 also includes one or more bells disposed within the drum 121 that provide a conventional auditory alert while the reel 120 is rotating. In other implementations, the drum 121 of the reel 120 can be empty (i.e., not containing a bell). In certain such implementations, the rattle reel 100 has a visual indictor and no auditory indicator. Accordingly, the rattle reel 100 will remain silent even during rotation of the reel 120 relative to the housing 110.

In certain implementations, the sticky indicator includes an electronic micro switch 155 carried by the housing 110. The electronic micro switch 155 interfaces with the reel 120 so that movement of the reel 120 causes the electronic micro switch 155 to toggle from a deactuated state to an actuated state.

In certain examples, the electronic micro switch 155 includes an arm 156 that is biased against a circumferential edge of the reel 120 (e.g., of the flange 123). In certain examples, the circumferential edge defines one or more notches 126 into which the arm 156 is biased when aligned with the notch 126. When the arm 156 of the electronic micro switch 155 is biased into the notch 126, the switch 155 is in the deactuated state. When the reel 120 rotates relative to the housing 110, the arm 156 cams along the circumferential edge until out of the notch 126, thereby transitioning the electronic micro switch 155 to the actuated state. When actuated, the switch 155 triggers the electronic indicator. As discussed above, the user resets the electronic indicator using the user interface member 158. In certain implementations, the user manually rotates the reel 120 (e.g., using the manual take-up member 135) until the arm 156 of the electronic micro switch 155 is located within a notch 126 of the reel 120 before actuating the user interface member 158.

In some implementations, the electronic indicator is a sticky indicator. Once triggered by actuation of the micro switch 155, the indicator remains activated until the user manually deactivates the indicator using the user interface member 158. Accordingly, the indicator will continue to provide an alarm (visual, auditory, or otherwise) even if the fish escapes the line or ceases to move. In other implementations, the electronic indicator remains activated only while the micro switch 155 is being actuated.

In accordance with certain aspects of the disclosure, the rattle reel 100 includes a work light 140 carried by the housing 110. In certain examples, the work light 140 is electrically coupled to the power source 159. In certain implementations, the work light 140 is activated independent of the indicator. For example, in certain implementations, the work light 140 is electrically coupled to a user interface member (e.g., a switch, a button, etc.) 148 accessible from an exterior of the housing 110 (e.g., see FIG. 8). Accordingly, the user can manually activate or deactivate the flashlight using the user interface member 148. In certain examples, the user interface member 148 is located adjacent the user interface member 158.

In certain implementations, the work light 140 includes one or more LEDs 145 facing away from the housing 110. In other implementations, the work light 140 can include a light bulb or other light source. The work light 140 is positioned and oriented to shine light away from the housing towards the surface on which the rattle reel 100 rests. For example, as shown in FIG. 2, the work light 140 can direct light in a cone L away from the housing 110. In some examples, the work light 140 directs light to shine on the reel 120. In other examples, the work light 140 directs light to shine on the ground where a fishing hole would be.

In use, a user can set up the rattle reel 100 at a fishing hole (e.g., within an ice fishing shelter, outside on a lake, etc.). For example, the user can extend the legs 105 and stand the rattle reel 100 adjacent the hole in the ice. In some examples, the user can adjust the angle of the legs 105 to accommodate the size of the fishing hole and/or the surrounding topography.

If desired, the user toggles the user interface member 158 to deactivate the sticky indicator. The user then unwinds the fishing line from the reel 120, through the hole, and into the water. If needed, the user may activate the work light 140 to facilitate viewing of the line, hole, or surrounding area.

When a sufficient amount of line has been paid out from the reel 120, the user sets the electronic micro switch 155 to the deactuated state and toggles the user interface member 158 to the set the sticky indicator. For example, the user may rotate the reel 120 until an arm 156 of the electronic micro switch 155 is located within a notch 126 in the circumferential edge of the reel 120. Once set, the rattle reel 100 stands ready for a fish.

A tug on the distal end of the fishing line will cause the line to pay out from the reel 120. Paying out the line causes the reel 120 to rotate relative to the housing 110, which triggers the sticky indicator. For example, the arm 156 of the micro switch 155 may cam out of the notch 126, thereby toggling to the actuated state. In various examples, triggering the indicator activates one or more lights (e.g., LEDs) and/or sets off an auditory alarm (e.g., buzzing, siren, etc.). The indicator remains triggered (e.g., the lights and/or sounds remain activated) until the user manually deactivates the indicator using the user interface member 158.

In some implementations, the user manually pulls up on the line to check the distal end of the line. If desired, the user can activate the work light 140 (e.g., using the user interface member 148). When finished fishing, the user may wind the fishing line back onto the reel 120 using the manual take-up member 135. Alternatively, the user may remove the fishing line from the reel 120 and wind fishing line onto the reel 120 prior to the next fishing experience.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A rattle reel for fishing at a hole through a surface, the rattle reel comprising:
    a housing having a closed top, a bottom, a first side, and a second side defining an interior, the housing being supported by a plurality of legs that extend away from the housing to distal ends of the legs, the distal ends being configured to rest on the surface, each of the legs being telescoping so that a length of the leg is adjustable, each of the legs also being coupled to the housing so that an angle at which the leg extends from the housing also is adjustable;
    a reel carried by the housing so that the reel is partially disposed within the interior of the housing and extends between the first and second sides of the housing, the reel having a drum sized and structured to hold a fishing line wound around the drum;
    an indicator arrangement disposed within the interior of the housing, the indicator arrangement being operationally coupled to the reel so that movement of the reel relative to the housing activates the indicator arrangement, wherein the indicator arrangement remains activated until a user manually resets the indicator arrangement;
    a light source recessed within the housing separate from the indicator arrangement, the light source being configured to shine light through an opening defined at the bottom of the housing, the light source being activated by actuation of a user interface member accessible from an exterior of the housing.

2. The rattle reel of claim 1, wherein the indicator arrangement includes an audible indicator.

3. The rattle reel of claim 2, wherein the indicator arrangement includes a visual indicator.

4. The rattle reel of claim 1, wherein the indicator arrangement includes a visual indicator.

5. The rattle reel of claim 1, wherein the user interface member is a first user interface member; and further comprising a second user interface member carried by the housing, the second user interface member being operationally coupled to the indicator arrangement so that actuation of the second user interface member resets the indicator arrangement.

6. The rattle reel of claim 5, wherein the light source is activated independent of movement of the reel relative to the housing.

7. The rattle reel of claim 6, wherein the first user interface member is carried by the housing.

8. The rattle reel of claim 1, wherein the reel includes an externally accessible manual take-up member by which the user manually winds the fishing line onto the drum.

9. A rattle reel for fishing, the rattle reel comprising:
    a free-standing housing including an adjustable leg, the leg extending along a length from the housing to a distal end of the leg, the length of the leg being adjustable, the leg being sufficiently long to extend along a majority of a height of the rattle reel when fully extended;
    a reel coupled to the housing, the reel having a drum sized and structured to hold a fishing line wound around the drum;
    a power source carried by the housing;
    a light source carried by a bottom surface of the housing facing the distal end of the leg and electrically coupled to the power source, the light source being configured to shine light away from the reel towards the distal end of the leg; and
    a user interface member accessible from an exterior of the housing and electrically coupled to the light source, the user interface member activating and deactivating the light source when operated by a user.

10. The rattle reel of claim 9, further comprising an indicator arrangement electrically coupled to the power source, the indicator arrangement being configured to activate when the reel moves relative to the housing.

11. The rattle reel of claim 10, wherein the indicator arrangement is activated by actuation of an electronic micro switch carried by the housing, the electronic micro switch being actuated by movement of the reel relative to the housing.

12. The rattle reel of claim 11, wherein the electronic micro switch has a portion engaging the reel, wherein the reel is shaped with at least one depression, wherein the indicator arrangement remains deactivated while the portion of the electronic micro switch engages the depression, and wherein the indicator arrangement is activated when the portion of the electronic micro switch cams out of the depression during movement of the reel relative to the housing.

13. The rattle reel of claim 11, wherein the indicator arrangement includes a buzzer.

14. The rattle reel of claim 11, wherein the indicator arrangement includes a light emitting diode arrangement.

15. The rattle reel of claim 11, wherein the indicator arrangement includes a buzzer and a light emitting diode arrangement.

16. The rattle reel of claim 9, wherein the free-standing housing includes a plurality of adjustable legs including the adjustable leg.

17. The rattle reel of claim 16, wherein the legs are telescoping legs.

18. The rattle reel of claim 9, wherein the reel includes a manual take-up member that defines a thumb depression.

19. The rattle reel of claim 1, wherein the rattle reel extends along a height between the surface to a top of the rattle reel, and wherein the legs extend along a majority of the height of the rattle reel when fully extended.

* * * * *